(12) United States Patent
Schneider et al.

(10) Patent No.: US 10,059,042 B2
(45) Date of Patent: Aug. 28, 2018

(54) METHOD FOR PRODUCING FIBER PREFORMS

(71) Applicant: TEIJIN CARBON EUROPE GMBH, Wuppertal (DE)

(72) Inventors: Markus Schneider, Düsseldorf (DE); Björn Lehmhaus, Radebeul (DE)

(73) Assignee: TEIJIN CARBON EUROPE GMBH, Wuppertal (DE)

( * ) Notice: Subject to any disclaimer, the term of this patent is extended or adjusted under 35 U.S.C. 154(b) by 537 days.

(21) Appl. No.: 14/438,162

(22) PCT Filed: Oct. 11, 2013

(86) PCT No.: PCT/EP2013/071259
§ 371 (c)(1),
(2) Date: Apr. 23, 2015

(87) PCT Pub. No.: WO2014/067763
PCT Pub. Date: May 8, 2014

(65) Prior Publication Data
US 2015/0273736 A1    Oct. 1, 2015

(30) Foreign Application Priority Data

Nov. 5, 2012   (EP) ..................................... 12191274

(51) Int. Cl.
*B29C 41/08*    (2006.01)
*B29D 99/00*    (2010.01)
(Continued)

(52) U.S. Cl.
CPC .............. *B29C 41/08* (2013.01); *B29B 11/16* (2013.01); *B29C 31/044* (2013.01);
(Continued)

(58) Field of Classification Search
CPC ..... B29C 41/08; B29C 70/545; B29C 64/205; B29C 64/106; B29C 31/044; B29C 70/38;
(Continued)

(56) References Cited

U.S. PATENT DOCUMENTS 3,011,257 A * 12/1961 Bamberger ........... B29C 41/365
                                                      225/103
3,810,805 A *  5/1974 Goldsworthy et al. ......................
                                                      B29C 70/388
                                                      156/271

(Continued)

FOREIGN PATENT DOCUMENTS

DE    202010017556 U1    3/2012
EP        1 144 738 B1    2/2004
(Continued)

OTHER PUBLICATIONS

Feb. 21, 2014 International Search Report issued in International Patent Application No. PCT/EP2013/071259.

*Primary Examiner* — Alison L Hindenlang
*Assistant Examiner* — Emmanuel S Luk
(74) *Attorney, Agent, or Firm* — Oliff PLC

(57) ABSTRACT

Described is a method for producing a fiber preform by deposition of reinforcing fiber bundles onto a surface including: supplying at least one continuous strand of reinforcing fibers provided with a binder to a deposition head, spreading the at least one strand in a spreader unit and conveying using a first conveying device to a longitudinal splitting device, cutting the at least one strand in the longitudinal splitting device along the longitudinal extension thereof into at least two partial strands by means of a splitting element, conveying the partial strands by means of a second conveying device to a cut-to-length unit, cutting the partial strands by means of the cut-to-length unit into reinforcing fiber bundles, and depositing the reinforcing fiber bundles onto a (Continued)

surface and/or reinforcing fiber bundles deposited on the surface and fixing the reinforcing fiber bundles to form the fiber preform.

18 Claims, 3 Drawing Sheets

(51) Int. Cl.
  *B29C 31/04* (2006.01)
  *B29B 11/16* (2006.01)
  *B29C 70/38* (2006.01)
  *B29C 70/54* (2006.01)
  *B29C 70/30* (2006.01)
  *B29K 63/00* (2006.01)
  *B29K 105/12* (2006.01)
  *B29K 105/00* (2006.01)

(52) U.S. Cl.
  CPC ........ *B29D 99/0078* (2013.01); *B29C 70/305* (2013.01); *B29C 70/38* (2013.01); *B29C 70/545* (2013.01); *B29C 2793/0081* (2013.01); *B29K 2063/00* (2013.01); *B29K 2105/12* (2013.01); *B29K 2105/253* (2013.01)

(58) Field of Classification Search
  CPC ................ B29C 70/305; B29C 64/118; B29C 2793/0081; B29B 11/16; B05D 1/02; B05D 1/28; B05D 11/16; B05D 12/00
  See application file for complete search history.

(56) References Cited

U.S. PATENT DOCUMENTS

| | | | | |
|---|---|---|---|---|
| 3,939,532 A * | 2/1976 | Wiegand | ................ | D01G 25/00 156/166 |
| 3,969,171 A * | 7/1976 | Bolen | ...................... | B32B 5/26 156/167 |
| 4,007,075 A * | 2/1977 | McClain | ................. | B29C 41/08 156/154 |
| 5,022,952 A * | 6/1991 | Vaniglia | ................... | B29C 53/66 156/441 |
| 5,093,059 A * | 3/1992 | Nathoo | ................. | B05B 7/1486 264/121 |
| 5,154,968 A * | 10/1992 | DePetris | ................... | B27N 1/00 264/118 |
| 5,192,387 A * | 3/1993 | Buckley | .................. | B29B 11/16 156/275.5 |
| 5,217,672 A * | 6/1993 | Kelman | ................ | B29C 70/305 264/121 |
| 5,336,455 A * | 8/1994 | Kelman | .................. | B29B 11/16 264/113 |
| 5,487,853 A * | 1/1996 | Buckley | .............. | B29C 35/0266 156/272.2 |
| 5,536,341 A * | 7/1996 | Kelman | .................. | B29C 41/08 156/283 |
| 5,612,405 A * | 3/1997 | Bainbridge | ................. | C08K 9/08 524/494 |
| 5,866,253 A * | 2/1999 | Philipps | .................. | B29B 11/16 156/167 |
| 6,113,818 A * | 9/2000 | Pellegrin | ............... | B29B 15/105 264/12 |
| 6,153,144 A * | 11/2000 | Byma | ....................... | B27N 3/02 264/113 |
| 6,251,185 B1 * | 6/2001 | Morrison | ............... | B29C 70/305 118/308 |
| 6,558,146 B1 * | 5/2003 | Shah | ..................... | B29C 31/044 425/113 |
| 7,063,870 B2 * | 6/2006 | La Forest | ............... | B32B 18/00 264/454 |
| 7,198,739 B2 * | 4/2007 | La Forest | ............... | B29B 11/16 156/89.26 |
| 8,057,618 B2 * | 11/2011 | Hamlyn | ................ | B29C 70/382 156/189 |
| 8,733,417 B2 * | 5/2014 | Hamlyn | ................ | B29C 70/384 156/425 |
| 9,144,945 B2 * | 9/2015 | Caffiau | .................. | B29C 70/382 |
| 2005/0161861 A1 * | 7/2005 | Lammers | ................ | B29B 11/16 264/255 |
| 2006/0086434 A1 * | 4/2006 | Cornie | .................. | B05B 7/1409 148/420 |
| 2009/0014119 A1 | 1/2009 | Wohlmann et al. | | |
| 2009/0229760 A1 * | 9/2009 | Hamlyn | ................ | B29C 70/384 156/433 |
| 2010/0091202 A1 * | 4/2010 | Ostergard | ............... | B29C 70/12 349/11 |
| 2011/0201243 A1 * | 8/2011 | Miele | .................... | C03C 25/243 442/331 |
| 2012/0244337 A1 * | 9/2012 | Gavin | ..................... | B32B 17/02 428/293.4 |
| 2013/0292863 A1 * | 11/2013 | Shoemake | .............. | B29C 31/02 264/40.1 |
| 2014/0033479 A1 * | 2/2014 | Dilo | ........................ | D04H 1/736 19/300 |
| 2015/0258762 A1 * | 9/2015 | Hagihara | ................ | B29C 70/12 156/62.4 |
| 2015/0273736 A1 * | 10/2015 | Schneider | ............... | B29B 11/16 264/101 |
| 2015/0292145 A1 * | 10/2015 | Sonoda | .................... | C08J 5/043 442/60 |
| 2015/0298163 A1 * | 10/2015 | Schneider | ............... | B29B 11/16 427/189 |
| 2015/0375460 A1 * | 12/2015 | Tadepalli | ............... | C08G 69/08 264/45.3 |

FOREIGN PATENT DOCUMENTS

| | | |
|---|---|---|
| EP | 1 394 295 A2 | 3/2004 |
| EP | 1723272 A1 | 11/2006 |
| EP | 2 351 880 A2 | 8/2011 |
| JP | 2008-254191 A | 10/2008 |
| WO | 98/22644 A1 | 5/1998 |
| WO | 00/32856 A1 | 6/2000 |
| WO | 02/055770 A1 | 7/2002 |
| WO | 2005/087993 A1 | 9/2005 |
| WO | 2005/095080 A1 | 10/2005 |
| WO | 2011/045172 A1 | 4/2011 |
| WO | 2012/072405 A1 | 6/2012 |
| WO | 2013/017434 A1 | 2/2013 |

\* cited by examiner

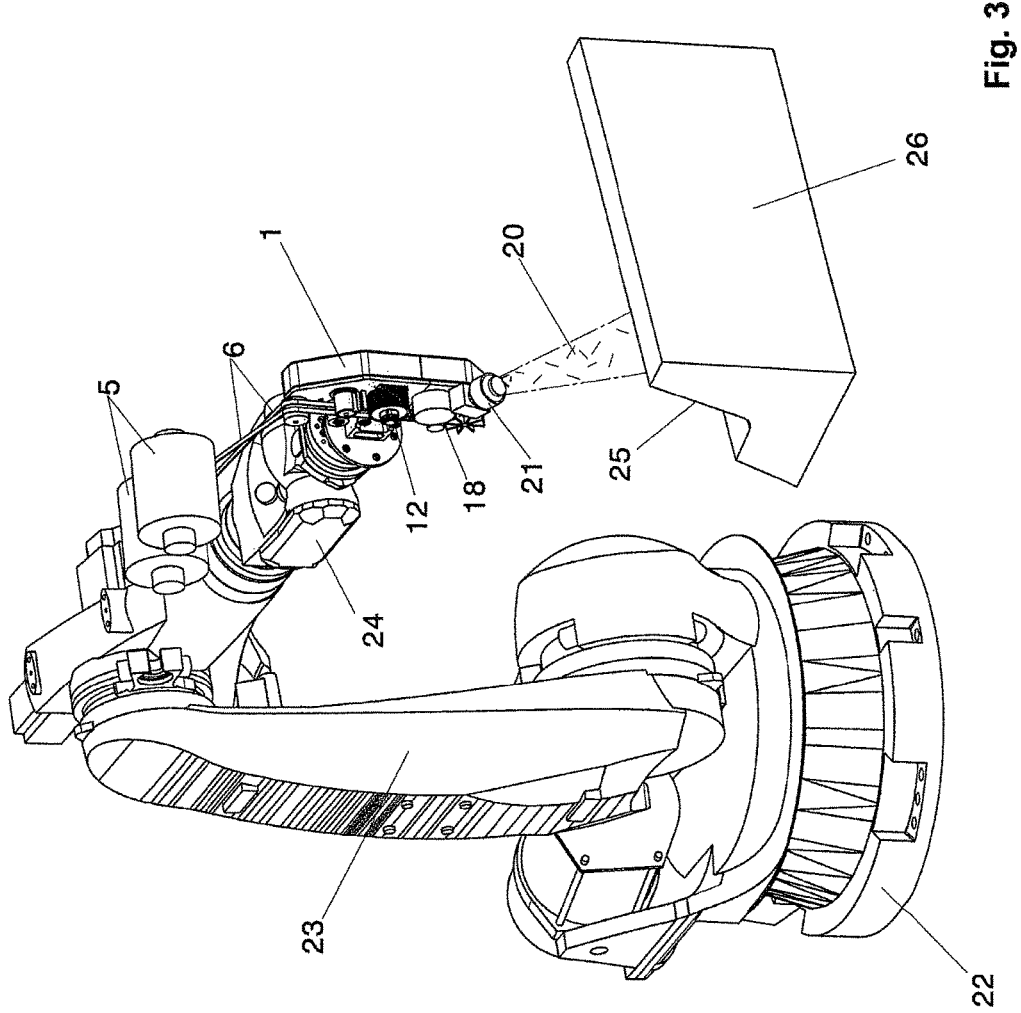

METHOD FOR PRODUCING FIBER PREFORMS

BACKGROUND

The present disclosure relates to a method for producing a fiber preform by deposition of reinforcing fiber bundles on a surface and/or on reinforcing fiber bundles deposited on the surface. The disclosure further relates to the production of a fiber composite component using a fiber preform produced in such a way.

Components made from fiber composites are increasingly used, especially in the aerospace industries, yet also e.g. in the machine building industry or the automotive industry. Fiber composites often offer the advantage of lower weight and/or higher strength over metals. The volume percentage of the reinforcing fibers and especially also the orientation of the reinforcing fibers have a determining effect on the resistance of the components, in particular, the rigidity and strength thereof. Nevertheless, heavy-duty materials and components of this type must still be able to be produced cost effectively in order to be economically attractive.

To produce composite components of this type, so-called fiber preforms are initially produced from reinforcing fibers in an intermediate step. These are textile, semi-finished products in the form of two- or three-dimensional configurations made from reinforcing fibers, wherein the shape can already be nearly the shape of the final component. For embodiments of fiber preforms of this type that consist substantially only of the reinforcing fibers and for which the matrix percentage required for the production of the component is still at least largely absent, a suitable matrix material is incorporated in the fiber preform in additional steps via infusion or injection, or also by application of vacuum. Subsequently, the matrix material is cured as a rule at increased temperatures and pressures to form the finished component. Known methods for infusion or injection of the matrix material are the liquid molding (LM) method, or methods related thereto, such as resin transfer molding (RTM), vacuum assisted resin transfer molding (VARTM), resin film infusion (RFI), liquid resin infusion (LRI), or resin infusion flexible tooling (RIFT). The fiber material used to produce the fiber preforms can also already be pre-impregnated e.g., with small amounts of a plastic material, i.e., a binder material, in order to improve the fixing of the reinforcing fibers in the fiber preform. Pre-impregnated yarns of this type are described for example in WO 2005/095080.

Methods are also known in which composite components are produced from fiber preforms that already have a sufficient content of matrix material for the composite component. In these cases, these fiber preforms can be e.g., compacted directly into the component in a mold using increased pressure and/or increased temperature. Alternatively, it is possible to use a vacuum bag instead of a mold, into which vacuum bag the fiber preform is inserted and, after application of a vacuum and as a rule at increased temperature, is compacted to form the component. The content of matrix material sufficient for the component can, for example, be achieved in that the fiber preform is produced from reinforcing fiber bundles that are produced from prepregs with the corresponding matrix content. Alternatively, during the deposition of e.g., reinforcing fiber bundles to form the fiber preform, additional matrix material can be sprayed on e.g., during the deposition.

To produce fiber preforms from reinforcing fiber bundles, automated processes are often used in which the fiber bundles are deposited by means of controlled deposition heads or also fiber deposition devices on or in corresponding molds, wherein the deposition can also take place by spraying the fiber bundles on or in the molds. As a rule, a continuous yarn of reinforcing fibers is hereby fed to the deposition heads, which yarn is then cut to the desired bundle length in the deposition head or in the fiber deposition device by means of suitable cutting devices. Deposition heads of this type with a device for cutting the fiber strands to length are disclosed, for example, in WO 2011/045172 or U.S. Pat. No. 3,011,257.

Fiber preforms can, for example, be produced in that short-cut reinforcing fibers, together with a binder material, are sprayed and dispersed on an air-permeable screen adapted to the shape of the desired fiber preform, and the fibers are maintained on the screen through the application of vacuum until, after cooling of the binder material, a sufficient stability of the preform is achieved. A method of this type is described for example in WO 98/22644. By means of the method from WO 98/22644, the reinforcing fibers are preferably arranged as short-cut fibers in random, isotropic arrangement and orientation. According to the examples of WO 98/22644, fiber volume fractions only in the range of up to approximately 15 vol. % are achieved, and thus, because of the low fiber volume fractions, only a comparatively low thickness-related strength of the components.

To achieve higher fiber volume fractions in preforms or components produced therefrom, it is advantageous according to the embodiments of WO 2012/072405 to deposit the short-cut fibers in the form of bundles of reinforcing fibers, wherein the fiber bundles preferably have a length in the range from 10 to 50 mm. In addition, it is advantageous, in consideration of the highest possible fiber volume percentages, and thus the highest achievable mechanical characteristics, if the bundles have the lowest possible number of reinforcing fiber filaments, wherein a number of 1000 to 3000 filaments is particularly preferred. In this way, a virtually isotropic material is created with virtually isotropic mechanical characteristics in the directions of extension thereof. At the same time, due to the relatively small bundle dimensions, this material has no or only few regions with increased resin proportion and thus a reduced reinforcing fiber proportion, which regions can lead to weak points in the component. It is relatively easy to see that the use of bundles of reinforcing fibers with low linear density, i.e., with low filament counts, leads to increased costs, in particular due to the use of relatively high-priced source materials as well. On the other hand, although the use of high linear density fiber bundles, i.e., of fiber bundles with a high number of reinforcing fiber filaments, is indeed more cost effective, high fiber volume fractions, as already explained, can be realized only with difficulty, if at all.

There exists therefore a need for an automatable method for producing a fiber preform, by means of which a cost-effective production of fiber preforms is possible while achieving high fiber volume fractions in the fiber preforms or in the composite components produced therefrom.

BRIEF SUMMARY

It is therefore the object of the present disclosure to provide a method of this type for producing a fiber preform. The object of the disclosure is achieved by a method for producing a fiber preform by deposition of reinforcing fiber bundles on a surface and/or on reinforcing fiber bundles deposited on the surface, wherein the method comprises the steps:

supplying at least one continuous, ribbon-shaped strand of reinforcing fibers provided with a binder from a supply device to a deposition head, wherein the at least one strand has a width of at least 5 mm and a concentration of the binder in the range of 2 to 70 wt. % relative to the weight of the ribbon-shaped strand, spreading the at least one continuous, ribbon-shaped strand in a spreader unit arranged on the deposition head and conveying the at least one strand in the conveying direction by means of a first conveying device arranged on the deposition head to a longitudinal splitting device arranged on the deposition head, stabilizing thereby the at least one strand in the direction transverse to the conveying direction, cutting the at least one strand in the longitudinal splitting device along the longitudinal extension thereof into two or more partial strands by means of at least one splitting element, conveying the partial strands in the conveying direction by means of a second conveying device arranged on the deposition head to a cut-to-length unit arranged on the deposition head, cutting the partial strands by means of the cut-to-length unit into reinforcing fiber bundles of defined length, and depositing the reinforcing fiber bundles on a surface and/or on reinforcing fiber bundles deposited on the surface and fixing the reinforcing fiber bundles on the surface and/or on reinforcing fiber bundles deposited on the surface to form the fiber preform, wherein a relative movement between the deposition head and the surface is adjusted to provide load-appropriate deposition of the reinforcing fiber bundles on the surface.

BRIEF DESCRIPTION OF THE DRAWINGS

FIG. 3: Deposition device with articulated arm robot.

DETAILED DESCRIPTION

Figure 1:
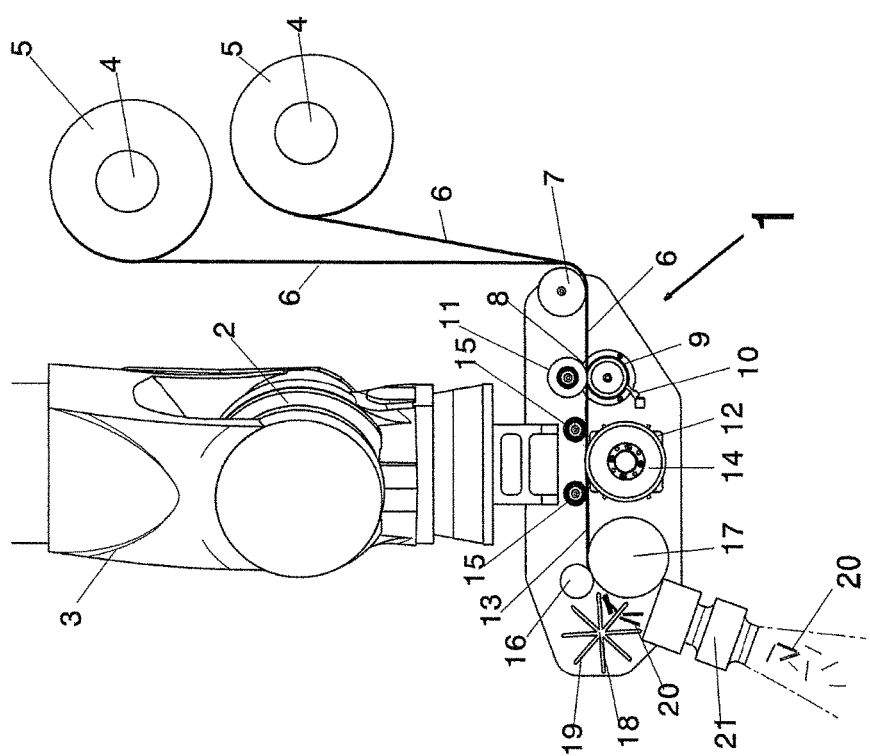
FIG. 1: Side view of a segment of the deposition device with deposition head.

By means of the method described herein, a cost-efficient production of fiber preforms from reinforcing fiber bundles is possible, i.e., from fiber bundles made from reinforcing fibers, having low numbers of reinforcing fiber filaments while realizing high fiber volume percentages in the fiber preform or the fiber composite component produced therefrom. By this means, continuous ribbon-shaped strands, for example, in the form of cost-efficient, high linear density reinforcing fiber yarns, can be used as the source material. High linear density reinforcing fiber yarns of this type can initially be split by means of the longitudinal splitting device into several partial strands along the extension of the reinforcing yarn filaments forming the yarns, wherein the individual partial strands then have a reduced number of filaments when compared to the original yarn.

Carbon, glass, aramid fibers, or mixtures of these fibers among themselves or with thermoplastic fibers are preferably used for the reinforcing fibers in the method described herein, which fibers form the at least one ribbon-shaped strand. Carbon fibers are particularly preferred.

In a preferred embodiment, the at least one continuous, ribbon-shaped strand of reinforcing fibers provided with a binder is a filament yarn with a filament count of at least 12000 filaments, which yarn has been spread into a ribbon-shaped form. Filament yarns of this type with a filament count in the range from 24000 to 50000 are particularly preferred. In the case that the ribbon-shaped strand of reinforcing fibers provided with a binder is a filament yarn, then the concentration of the binder in a preferred embodiment lies in the range from 2 to 14 wt. %, and in a particularly preferred embodiment in the range from 3 to 7 wt. % relative to the total weight of the filament yarn provided with the binder.

The binder can be a fiber preparation, as is commonly applied to the filaments of the filament yarn to achieve an improved processability and a good cohesion of the fibers, i.e., an at least partial connection of the fibers among each other. Preparations of this type are commonly based on epoxy resins. For the method described herein, however, an increased content is required, in contrast to the commonly used concentrations of the preparation, which content is, as explained, preferably in the range from 2 to 14 wt. % and particularly preferably in the range from 3 to 7 wt. % relative to the total weight of the filament yarn provided with a binder.

As binders, thermoplastic, uncured or partially cured duroplastic polymers, or also polymer compositions of these polymers can be used. Suitable thermoplastic polymers are, for example, polyethyleneimine, polyetherketone, polyetheretherketone, polyphenylene sulfide, polysulfone, polyethersulfone, polyetherethersulfone, aromatic polyhydroxyethers, thermoplastic polyurethane resins, or mixtures of these polymers. As uncured or partially cured duroplastic polymers, for example, epoxides, isocyanates, phenol resins, or unsaturated polyesters can be used. It is thereby advantageous if the continuous, ribbon-shaped strand of reinforcing fibers provided with a binder is a filament yarn which is not tacky at the processing temperature in the area of the deposition head, i.e., as a rule at room temperature, and can, for example, be unwound from a spool. At increased temperatures, the binder or the reinforcing fibers provided with the binder should, however, be tacky and lead to a good adhesion for the fiber bundles produced therefrom. Reinforcing fiber yarns or strands of reinforcing fibers of this type are described for example in WO 2005/095080, to which explicit reference is made. The filament yarns there have been infiltrated with a binder composed of a plurality of different epoxy resins, wherein these epoxy resins differ from each other in a defined manner with regard to the characteristics thereof such as epoxy value and molecular weight, as well as with regard to their concentrations.

In a preferred embodiment of the method described herein, the at least one strand is a pre-impregnated filament yarn and the binder consists of a first and a second resin composition, wherein the filaments of the filament yarn are impregnated with a first resin composition and are connected at least partially via the first resin composition, wherein the first resin composition contains at least two bisphenol A epichlorohydrin resins H1 and H2 in a weight ratio H1:H2 of 1.1 to 1.4, wherein H1 has an epoxy value of 1850 to 2400 mmol/kg, an average molecular weight $M_N$ of 800 to 1000 g/mol, and is solid at room temperature, and H2 has an epoxy value of 5000 to 5600 mmol/kg, an average molecular weight $M_N$ of <700 g/mol, and is liquid at room temperature, and additionally contains an aromatic polyhydroxyether P1, which has an acid value of 40 to 55 mg KOH/g and an average molecular weight $M_N$ of 4000 to 5000 g/mol, and wherein the pre-impregnated filament yarn has a second resin composition on the outside thereof in the form of particles or drops adhering to the filaments, wherein the second resin composition is solid at room temperature, has a melting temperature in the range from 80 to 150° C., and is present on the outside of the yarn in a concentration of 0.5 to 10 wt % relative to the total weight of the pre-impregnated filament yarn, and wherein at least 50% of the surface area of the outside of the yarn is free of the second resin composition and the yarn interior is free of the second resin composition. Filament yarns of this type pre-impregnated with a binder are described in patent application WO 2013/017434, to which reference is explicitly made concerning the disclosure in this regard.

In a further preferred embodiment, the at least one strand can be a prepreg made of reinforcing fibers arranged unidirectionally in the direction of extension of the prepreg, and thus in the conveying direction of the prepreg. Within the context of the present disclosure, a prepreg is understood as a semi-finished product of reinforcing fibers impregnated with a polymer matrix system. This can thereby be a tow prepreg, i.e., an individual yarn that is impregnated with a matrix system. However, it can also be a sheet-form semi-finished product that consists of reinforcing fibers oriented unidirectionally and arranged adjacent and parallel to each other, which reinforcing fibers are impregnated with a matrix system. In the case that a prepreg is used, then the matrix system is the binder.

As the matrix system or binder, thermoplastic polymers, uncured or partially cured duroplastic polymers, or polymer compositions are likewise used in these cases, wherein the previously listed polymers can be used. In the case that the at least one strand of reinforcing fibers provided with a binder is a prepreg, then it is preferred when the binder, i.e., the matrix system, is present in a concentration in the range from 15 to 70 wt. % relative to the weight of the prepreg, and, in the case that the reinforcing fibers are carbon fibers, particularly preferably in the range from 20 to 60 wt. %.

The at least one ribbon-shaped strand of reinforcing fibers provided with a binder can be unwound from a spool or, in the case of a prepreg being used, from a roll as a supply device, and fed to the deposition head. Preferably the supply device, i.e., the spool or roll, is rigidly connected to the deposition head, so that during movements of the deposition head, the supply device is carried with it. By this means, a stable movement of the at least one strand is achieved.

To improve a secure positioning of the at least one ribbon-shaped strand, to increase the width thereof, and to achieve a good result of the longitudinal cutting device, the at least one strand is fed via a spreader unit arranged on the deposition head, which spreader unit is arranged, when viewed across the deposition head, in front of the first conveying device in the conveying direction of the at least one continuous ribbon-shaped strand. A single rod or an arrangement of a plurality of fixed and/or rotatably mounted rods is suitable as the spreader unit, by means of which rods the thread tension can be increased. The surface of the rods should be advantageously constituted so that abrasion of the yarn strands fed over the rods is kept low. Known surfaces and materials can be used for this purpose. The rods are arranged preferably so that the at least one continuous, ribbon-shaped strand is fed with an angle of wrap in the range of greater than 20° around the rods.

Preferably, the at least one strand of reinforcing fibers provided with a binder has a width of at least 6 mm. It is likewise preferred if the at least one strand has a ratio of width to thickness of at least 20.

Following the spreader unit, the at least one strand passes through the first conveying device, by means of which a defined conveying speed is set for the at least one strand, and through which the at least one strand is fed to the longitudinal splitting device.

The at least one strand is stabilized via suitable devices for lateral guiding of the at least one strand of reinforcing fibers in the direction transverse to the conveying direction, so that the strand is fed directly and without lateral deviations through the individual conveying and splitting devices. By this means, a clean cut with clean cut edges can be achieved in the longitudinal splitting device, because the cut can take place at least substantially parallel to the filaments of the at least one strand. For this purpose, rods, rolls, rollers, or other guiding devices, as well as possibly the conveying devices, are aligned at right angles to the conveying direction of the at least one ribbon-shaped strand as well as parallel to each other. In addition, rods, rolls, rollers, and other guiding elements, via which the at least one ribbon-shaped strand is guided, can be convex at the respective contact points with the strand. The contour of the guide elements in the region of the convexity preferably has a radius in the range from 50 to 600 mm.

It is advantageous for the longitudinal and transverse cutting process (cut-to-length process) if the at least one strand of reinforcing fibers is fed under tension through the deposition device, and in particular, if a tension is generated in the at least one strand of reinforcing fibers between the first and second conveying devices. By this means, a secure flattening and a good spreading is achieved for the at least one strand of reinforcing fibers, as well as a stable movement of the at least one strand of reinforcing fibers, which in particular fosters a good cutting result in the longitudinal splitting device. This, for example, can be achieved in that the speeds of the first and second conveying devices are set such that the speed of the second conveying device is higher than the speed of the first conveying device. The at least one strand is preferably fed to the longitudinal splitting device at a thread tension in the range from 40 to 300 cN per mm of strand width.

The first and/or second conveying device passed through by the at least one strand consists in an advantageous embodiment of one or more driven rolls or rollers, by means of which the at least one strand is transported. The rolls or rollers can be arranged with respect to each other such that in the application, the at least one strand of reinforcing fibers can loop around the roll or roller. In a further preferred embodiment, the first and/or second conveying device comprises a driven pair of rollers, the speed of which can be controlled, with an adjustable gap between the rollers of the roller pair, through which gap the at least one strand of reinforcing fibers is conveyed as a result of the pressure exerted by the roller pair.

In addition, in a likewise preferred embodiment, the first and/or second conveying device can comprise a blowing device, by means of which the at least one continuous, ribbon-shaped strand of reinforcing fibers is conveyed. For this purpose, the blowing device is coupled to an air supply that can be regulated.

The at least one strand is cut along the longitudinal extension thereof into partial strands by means of the longitudinal splitting device. The partial strands thus obtained have preferably a width in the range from 0.5 to 5 mm and particularly preferably in the range from 0.5 to 3 mm. Using fiber bundles produced from partial strands of this type, high fiber volume percentages can be achieved in the fiber preform or the fiber composite components produced therefrom.

The longitudinal splitting device comprises at least one splitting element for splitting the at least one strand of reinforcing fibers along the longitudinal extension thereof. The at least one splitting element of the longitudinal splitting device can be at least one laser beam arrangement, air jet arrangement, or water jet arrangement, or a mechanical splitting element, e.g., in the form of at least one fixed element, e.g., a fixed knife, or also in the form of at least one rotating splitting disk, which is preferably driven. The drive can be regulated and designed such that a speed difference can be adjusted between the circumferential speed of the at least one splitting disk and the conveying speed of the at least one strand of reinforcing fibers passing through the longitudinal splitting device. The rotational direction of the at least one rotating splitting disk can be in the conveying direction of the at least one ribbon-shaped strand or also opposed to it. In the method described herein, it has been found to be advantageous if the circumferential speed of the at least one splitting disk is 2 to 15% higher than the conveying speed of the at least one strand passing through the longitudinal splitting device. A circumferential speed of the at least one splitting disk that is 4 to 10% higher than the conveying speed of the at least one strand is particularly advantageous.

In a preferred embodiment, in the case in which the at least one splitting element is a mechanical splitting element, the at least one strand and the at least one splitting element are pressed against each other using a defined force by means of a force-controlled hold-down device. The rotating splitting disk can, for example, be connected to a force-controlled hold-down device, by means of which the rotating splitting disk is pressed with a defined force against the at least one strand of reinforcing fibers to be split along the longitudinal extension thereof. Preferably, the at least one strand is pressed against the at least one mechanical splitting element by the hold-down device. When used in the case in which the at least one strand of reinforcing fibers has a twist, for example a yarn twist, in the case that the strand is a yarn, a splitting of the strand in the region of the twist transverse to the fiber direction can be avoided by means of a hold-down device of this type. An existing partial splitting of the strand transverse to the fiber direction can lead to tearing of the strand, and as a result, to an interruption of the cutting process and thus of the deposition process.

In an advantageous embodiment of the method, the at least one strand of reinforcing fibers provided with a binder can be cut into more than two partial strands in the longitudinal direction. In this way, the number of filaments in the individual partial strands can be reduced to such an extent that fiber bundles with sufficiently low width are obtained. The use of fiber bundles of this type with lower width in turn enables the realization of higher fiber volume percentages in the fiber preform produced therefrom or in the resulting composite components. The number of splitting elements of the longitudinal splitting device is then determined by the number of partial strands that should be obtained.

It is likewise a preferred embodiment if the at least one strand is cut into partial strands of different widths. The at least one splitting element can thus be arranged relative to the devices for lateral guiding of the at least one continuous, ribbon-shaped strand of reinforcing fibers, such that the at least one strand is divided centrally or off-center into partial strands. Likewise, in the case of an individual strand of reinforcing fibers, which should be split into three or more partial strands, the multiple splitting elements can be arranged relative to each other and/or relative to the devices for lateral guiding, such that partial strands of differing widths result.

In a preferred embodiment of the method described herein, multiple continuous, ribbon-shaped strands of reinforcing fibers provided with a binder are made available and guided to the deposition head or to the devices arranged thereupon such as, among others, the longitudinal splitting device and the cut-to-length unit. The strands can thereby be identical or different. For example, all of the multiple strands can be strands of carbon fibers. However, for example, strands of carbon fibers can also be combined with strands of glass fibers.

In the case of guiding multiple strands of reinforcing fibers provided with a binder to the deposition head, multiple supply devices are then present, e.g., in the form of a creel and a corresponding number of devices for lateral guiding of the individual strands. By this means, the multiple strands can be fed so that they are arranged next to one another, wherein the individual strands can be at a distance to each other or can also lie in contact with each other. The longitudinal splitting device then comprises multiple splitting elements, the number of which is determined by the number of partial strands that should be produced from the adjacently arranged multiple strands of reinforcing fibers. For example, the longitudinal splitting device has four splitting elements when two adjacently arranged, ribbon-shaped yarn strands should each be cut into three partial strands.

In a further preferred embodiment, in the case of supplying multiple continuous, ribbon-shaped strands of reinforcing fibers provided with a binder, i.e., multiple strands of reinforcing fibers, these strands can be fed by means of suitable guiding devices via the first conveying device to the longitudinal splitting device, such that the strands are arranged superposed, i.e., they lie on top of each other. In this case, the ribbon-shaped strands can be cut together by the same splitting element in the longitudinal direction. For example, the longitudinal splitting device then has two splitting elements for the case in which two ribbon-shaped yarn strands should each be cut into three partial strands.

After cutting the at least one strand of reinforcing fibers into partial strands, these partial strands are fed to the cut-to-length unit by means of the second conveying device. By means of the cut-to-length unit, the partial strands obtained in the longitudinal splitting device are then cut transverse to the extension direction thereof into fiber bundles of defined length, i.e., of a previously set length, wherein the length of the resulting fiber bundles depends on the frequency with which the cut is carried out transverse to the extension direction of the partial strands as a function of the conveying speed, i.e., the frequency of the transverse cutting. In a preferred embodiment, the cut-to-length unit is coupled to the conveying devices such that, by changing the conveying speed, the frequency of the transverse cutting is changed so that the length of the resulting reinforcing fiber bundles remains the same. In a further preferred embodiment, the frequency of the transverse cutting can be adjusted independent of the conveying speed so that, when the conveying speed remains the same, different lengths of reinforcing fiber bundles can be produced. Of course, a combination of the adjustment possibilities is also comprised by the embodiments described herein, for which combination on the one hand the conveyor speed serves as the actuating variable for the frequency of the transverse cutting, but the frequency of the transverse cutting can be varied at a set conveying speed. By this means, the length of the fiber bundles can be varied while carrying out the method described herein and e.g., adjusted to the contour properties of the fiber preform to be produced. Therefore, in a preferred embodiment, the frequency of the transverse cutting is changed over time to vary the length of the fiber bundles. The partial strands are preferably cut by means of the cut-to-length unit such that the resulting fiber bundles have a length in the range from 10 to 100 mm. A length of the fiber bundles in the range from 10 to 75 mm is particularly preferred.

With regard to the cut-to-length unit, known assemblies and methods for cutting reinforcing fibers transverse to the extension direction thereof can be used. Assemblies of this type include, for example, assemblies for water- or air jet cutting of fibers, for cutting fibers by means of laser beams, assemblies with e.g., pneumatically driven guillotine knives transverse to the conveying direction, rotating transverse cutters with cutting roller and counter roller, or also rotating cutting blades, the rotational axis thereof extending in the conveying direction of the partial strands, or at an angle thereto of up to 60°, preferably up to 20°. The latter rotational cutting blades are disclosed for example in DE 20 2010 017 556 U1 or EP-A-2 351 880. In a preferred embodiment, the partial strands are cut to length into fiber bundles by means of a rotating transverse cutter, in which the blades are pressed against the at least one strand of reinforcing fibers to be cut without exerting a substantial counter pressure on the other side of the strand. This method leads, in the case of brittle reinforcing fibers, such as carbon fibers or glass fibers, to a brittle fracture at the load point, and thus, to a clean cut-to-length of the strand of reinforcing fibers. Assemblies of this type are described e.g., in EP-A-1 144 738, EP-A-1 394 295, EP-A-1 723 272, or WO 02/055770, to which reference is explicitly made concerning the disclosure in this regard.

In a preferred embodiment, the fiber bundles obtained are transported away from the cut-to-length device by means of an appropriate device. This can take place e.g., by means of a short conveyor belt. The fiber bundles are particularly preferably transported away from the cut-to-length unit via the nozzle channel of a nozzle head pressurized with compressed air. A Venturi nozzle is preferably arranged in the nozzle channel of the nozzle head for introducing the compressed air into the nozzle channel. By this means, the fiber bundles for producing the fiber preform can be deposited at high speed, i.e., sprayed, on the surface and/or on reinforcing fiber bundles deposited on the surface.

The nozzle head for transporting the fiber bundles away can have means for introducing matrix material into the nozzle channel. In an advantageous embodiment of the method, particulate matrix material can be introduced via this means into the nozzle channel, which particulate matrix material can be applied, together with the cut-to-length fiber bundles, via the nozzle head, and deposited or sprayed on the surface and/or on the fiber bundles deposited on the surface. The means for introducing matrix material can be e.g., a Venturi nozzle, which projects into the nozzle channel and via which matrix particles are introduced into the nozzle channel. It can, however, also be a spray nozzle arranged in the nozzle channel, by means of which spray nozzle liquid matrix material is sprayed in. The feeding of matrix material can be advantageous in order to effect, during depositing of the fiber bundles produced by means of the deposition device on a surface, a better adhesion to each other due to the matrix material and thus, a better adhesion of the fiber bundles among each other and on the surface. At the same time, matrix material can already be supplied for example in the amount necessary for the production of a composite component during the production of the fiber preform.

With regard to the implementation of the method described herein, it can be advantageous, in view of a better adhesion to each other and thus, a better fixing of the fiber bundles among each other and to the surface, if the fiber bundles and the possibly supplied matrix material in particle or droplet form are heated after the cut-to-length unit, and prior to deposition, or during deposition on the surface and/or on the fiber bundles deposited on the surface. By this means, the binder with which the fiber bundles are provided and/or the matrix material can be activated, i.e., transformed into an adhesive state, e.g., in that the fiber bundles are heated to a temperature above the melting point of the binder. The heating can, for example, be effected by blowing with hot air or heated ambient air, laser radiation, or infrared radiation. After the fiber bundles contact the surface of the fiber preform to be produced, and after cooling, the fiber bundles are fixed via the then re-solidified binder.

According to a further preferred embodiment of the method, particle or droplet formed matrix material can also be sprayed, separately from the fiber bundles yet simultaneously with the fiber bundles, onto the surface and/or on the fiber bundles deposited on the surface. This can take place for example by directed spraying of particles or droplets of this type onto the surface using a heat source, such as a flame or a microwave or infrared field. A thermal spray method is preferred here, as is described in WO 98/22644 or US 2009/0014119 A1.

Depending on the binder with which the at least one strand of reinforcing fibers is provided, on the possibly supplied matrix materials, and on the temperatures prevailing during the deposition of the fiber bundles, a cooling step subsequent to the deposition of the fiber bundles is advantageous to stabilize the fiber preform.

According to embodiments, the reinforcing fiber bundles are deposited on a surface and/or on reinforcing fiber bundles deposited on the surface and are fixed on the surface and/or on reinforcing fiber bundles deposited on the surface to form the fiber preform. The surface, i.e., the deposition area, preferably already has a contour which is adapted to the contour of the fiber preform to be produced or the fiber composite component to be produced therefrom.

The surface or the deposition area can be a screen having holes, on which screen the fiber bundles are deposited, possibly with the simultaneous addition of matrix material, or onto which screen they are sprayed. In the case that a screen of this type is used, a fixing of the fiber bundles can be at least supported in that vacuum is applied to the side of the screen that is facing away from the side of the screen on which the fiber bundles are deposited. In this way, air is sucked through the screen, by which means the fixing of the fiber bundles can be achieved. The surface can also be provided with a binder or matrix material applied previously and adhesive during the deposition, so that an adhesion for the fiber bundles is ensured. The adhesion can also be effected by the matrix material using a simultaneous addition of matrix material together with the fiber bundles.

It is advantageous for the production of fiber composite components with high fiber volume percentages if a compacting step follows the step of depositing the reinforcing fiber bundles in the method described herein, wherein in the compacting step, the deposited reinforcing fiber bundles are compacted to achieve a higher fiber volume percentage. This compacting step can be carried out such that the preform obtained after deposition of the fiber bundles is exposed in a mold to an increased pressure, e.g., in a press, preferably at increased temperature. Likewise, the preform obtained after deposition of the fiber bundles can be packed into a vacuum bag and the compacting can be carried out by applying vacuum and at increased temperature.

In a preferred embodiment of the method for producing a fiber preform, the deposition head is connected with a controllable positioning unit, by means of which the deposition head is moved relative to the surface. In one configuration, the deposition head can be connected via an articulated arm robot located on a machine base, and can be positioned in at least two axes relative to the surface by means of the articulated arm and a robotic joint held by the articulated arm. In a further embodiment, the deposition head can be fixed via an articulated head in a gantry structure and can be positioned in at least two axes relative to the surface. The deposition head can be preferably positioned in at least 6 and particularly preferably in at least 9 axes.

In a further embodiment, the surface on which the fiber bundles are deposited is fixed, and the relative movement between the deposition head and surface is effected by a movement or positioning of the deposition head. Alternatively, the surface on which the fiber bundles are deposited can be moved, e.g., via an articulated arm robot, and the deposition head can be fixed. Of course, mixed forms of the present method are also included, in which e.g., the surface is moved in for example 6 axes via an articulated arm robot and the deposition head can be likewise positioned, for example in 3 axes.

Composite components can be produced from fiber preforms produced by means of the method described herein, which components are characterized by a high fiber volume percentage and thus, by high specific mechanical characteristics, such as high strength. The disclosure therefore also relates to a method for producing a fiber composite component by using a fiber preform which was produced according to the method described herein for producing a fiber preform, comprising the steps:

introduction of the fiber preform produced according to the method described herein into a shaping device, exposing the fiber preform to pressure and/or vacuum and/or increased temperature to form the fiber composite component, cooling the fiber composite component, removal of the fiber composite component from the shaping device.

Depending on the amount of matrix material present in the fiber preform used, as well as on the type of matrix material, different embodiments of the method arise for producing the composite component. Thus, a composite component can be produced using the previously listed method steps by direct compacting, without necessitating the supply of additional matrix material, if, according to the method described herein, the fiber preform used was produced using a prepreg for the at least one strand of reinforcing fibers provided with a binder, and the prepreg had a matrix or binder content above approximately 25 wt. %. Likewise, the production of the composite component e.g., by direct compacting, is possible, if the production of the fiber preform indeed proceeded from ribbon-shaped strands of reinforcing fibers provided with a binder, for which reinforcing fibers the concentration of the binder was comparatively low and not sufficient for the production of a component with a continuous matrix phase, but additional matrix material was supplied prior to deposition of the fiber bundles or during deposition of the fiber bundles.

The time for compacting under pressure and/or vacuum and at increased temperature depends in particular on the type of matrix material. If the matrix material is a thermoplastic polymer or a mixture of thermoplastic polymers, then the times for the compacting can be kept relatively short. For binders and/or matrix materials based on uncured or partially cured duroplastic polymers, the time required for the compacting depends on the times that are necessary for the curing of the matrix.

In the case that a fiber preform is used in the method for producing a composite component, in which fiber preform the fiber bundles have only a relatively low binder content, for example in the range from 2 to 14 wt % relative to the reinforcing yarn provided with a binder, and the binder is based e.g., on uncured or partially cured duroplastic polymers or resins, then matrix material still required for the production of the composite component can still be introduced into the shaping device according to the methods for infusion or injection of matrix material mentioned at the beginning, before a compaction into a component takes place under pressure and/or vacuum and at increased temperature.

To implement the method described herein, a deposition device is best suited, as will be explained by way of the following schematic representation in FIG. 1.

The deposition device will be subsequently explained in the following by way of the schematic representations in the figures. The content of the figures is as follows:

FIG. 1 shows a schematic representation of a segment of a deposition device, in which the deposition head 1 is connected to a controllable positioning unit 3 via a joint 2. Two supply devices 4 for spools 5 as means for providing the ribbon-shaped strands 6 of reinforcing fibers provided with a binder are connected in this case to the deposition head 1, which supply devices are preferably driven by means of control motors. The connection between the deposition head 1 and the supply devices can take place using suitable brackets (not shown here).

From the spools 5 located on the supply devices, ribbon-shaped strands 6 of reinforcing fibers provided with a binder are unwound and guided around a spreader roller 7, which is preferably convexly designed. By means of the spreader roller 7, the strands 6 are spread and if necessary spread apart. Due to the convex design of the spreader roller 7, a lateral guiding of the strand 6 can be simultaneously effected.

From the spreader roller 7, the strands 6 are fed to a first conveying device 8, which comprises a driven roller pair in the deposition device in FIG. 1. For this purpose, the lower roller 9 is pressed by means of a tensioning device 10 against the upper roller 11, provided with a rubber coating so that a conveying of the strands 6 can take place without slippage.

After passing through the first conveying device 8, the strands 6 are fed to the longitudinal splitting device 12, in which the strands 6 are cut along the extension direction thereof into partial strands 13. An arrangement of a plurality of rotating splitting disks 14 serves this purpose, against which the strands 6 to be split are pressed with a defined force by means of two force-controlled hold-down rollers 15. The partial strands 13 obtained in the longitudinal splitting device 12 are fed to the second conveying device 16, likewise implemented as a driven roller pair. By setting a speed difference between the second conveying device 16 and the first conveying device 8, in which the conveying speed of the second conveying device 16 is set slightly higher than that of the first conveying device 8, a defined tension can be applied to the strands 6 and the partial strands 13, by which means an improved cutting result is obtained in the longitudinal splitting device 12.

The lower roller 17 of the second conveying device 16 serves simultaneously as a counter roller for the cut-to-length unit 18, implemented as a rotating transverse cutter in the present example, comprising cutting roller 19 and counter roller 17. In the cut-to-length unit 18, the partial strands 13 are cut to reinforcing fiber bundles or fiber bundles 20 with a defined length. The cut-to-length fiber bundles 20 are taken from the cut-to-length unit by the nozzle head 21 and sprayed, via the nozzle channel of the nozzle head 21 pressurized with compressed air, at high speed onto a surface for producing a fiber preform.

Figure 2:
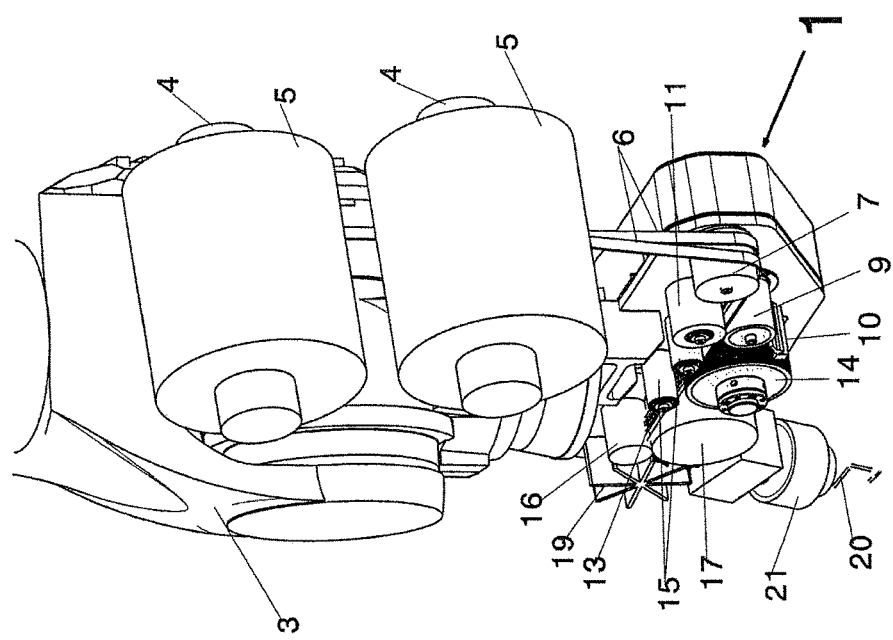
FIG. 2: Isometric representation of the segment of the deposition device from FIG. 1.

FIG. 2 shows for clarification of the spatial arrangement, in particular of the elements of the deposition head, a perspective representation of the segment of a deposition device depicted in FIG. 1, wherein the same reference numbers in the figures relate to the same elements in the device.

FIG. 3 shows an embodiment of the device that can be used in the method described herein, having an articulated arm robot 23 located on a machine base 22, at the end of which arm the deposition head 1 is mounted via a joint 24, and via which the deposition head can be moved in a plurality of axes relative to the surface 25 of a molded body 26 used for producing a fiber preform. By this means, the fiber bundles 20, obtained by means of the longitudinal splitting device 12 and the cut-to-length unit 18 on the deposition head 1 and applied via the nozzle head 21, can be sprayed in defined tracks onto the surface 25 according to the requirements of the structure of the fiber preform to be produced or the composite component to be produced therefrom.

The invention claimed is:

1. A method for producing a fiber preform by deposition of reinforcing fiber bundles on a surface and/or on reinforcing fiber bundles deposited on the surface, comprising:
supplying at least one continuous strand of reinforcing fibers provided with a binder from a supply device to a deposition head, wherein the at least one strand has a width of at least 5 mm, and a concentration of the binder is in the range of 2 to 70 wt. % relative to the weight of the strand,
spreading the at least one continuous strand in a spreader unit arranged on the deposition head and conveying the at least one strand in the conveying direction with a first conveying device arranged on the deposition head to a longitudinal splitting device arranged on the deposition head,
stabilizing the at least one strand in the direction transverse to the conveying direction,
cutting the at least one strand in the longitudinal splitting device along the longitudinal extension thereof into two or more partial strands with at least one splitting element,
conveying the partial strands in the conveying direction with a second conveying device arranged on the deposition head to a cut-to-length unit arranged on the deposition head,
cutting the partial strands with the cut-to-length unit into reinforcing fiber bundles of defined length, and
depositing the reinforcing fiber bundles on a surface and/or on reinforcing fiber bundles deposited on the surface and fixing the reinforcing fiber bundles on the surface and/or on reinforcing fiber bundles deposited on the surface to form the fiber preform, wherein a relative movement between the deposition head and the surface is adjusted to provide deposition of the reinforcing fiber bundles on the surface.

2. The method for producing a fiber preform according to claim 1, wherein the at least one strand is a filament yarn with a filament count of at least 12000 filaments.

3. The method for producing a fiber preform according to claim 1, wherein the at least one strand is a pre-impregnated filament yarn, and the binder comprises a first and a second resin composition, wherein the filaments of the filament yarn are impregnated with the first resin composition and are connected at least partially via the first resin composition, wherein the first resin composition contains at least two bisphenol A epichlorohydrin resins H1 and H2 in a weight ratio H1:H2 of 1.1 to 1.4, wherein H1 has an epoxy value of 1850 to 2400 mmol/kg, an average molecular weight $M_N$ of 800 to 1000 g/mol, and is solid at room temperature, and H2 has an epoxy value of 5000 to 5600 mmol/kg, an average molecular weight $M_N$ of <700 g/mol, and is liquid at room temperature, and additionally contains an aromatic polyhydroxyether P1, which has an acid value of 40 to 55 mg KOH/g and an average molecular weight $M_N$ of 4000 to 5000 g/mol, and wherein the pre-impregnated filament yarn has a second resin composition on the outside thereof in the form of particles or drops adhering to the filaments, wherein the second resin composition is solid at room temperature, has a melting temperature in the range from 80 to 150° C., and is present on the outside of the yarn in a concentration of 0.5 to 10 wt. % relative to the total weight of the pre-impregnated filament yarn, and wherein at least 50% of the surface area of the outside of the yarn is free of the second resin composition and the yarn interior is free of the second resin composition.

4. The method for producing a fiber preform according to claim 2, wherein the binder is present in a concentration in the range from 2 to 14 wt. % relative to the total weight of the filament yarn provided with the binder.

5. The method for producing a fiber preform according to claim 1, wherein the at least one strand is a prepreg with reinforcing fibers arranged unidirectionally in the extension direction of the strand.

6. The method for producing a fiber preform according to claim 5, wherein the binder is in a concentration in the range from 15 to 70 wt. % relative to the mass per unit area of the prepreg.

7. The method for producing a fiber preform according to claim 1, wherein the at least one strand is cut in the longitudinal direction into more than two partial strands.

8. The method for producing a fiber preform according to claim 1, wherein the at least one strand has a ratio of width to thickness of at least 20.

9. The method for producing a fiber preform according to claim 1, wherein the width of the partial strands lies in the range from 0.5 to 5 mm.

10. The method for producing a fiber preform according to claim 1, wherein the fiber bundles cut by means of the cut-to-length unit have a length in the range from 10 to 100 mm.

11. The method for producing a fiber preform according to claim 1, wherein multiple strands of reinforcing fibers provided with a binder are fed to the deposition head, wherein the multiple strands are the same or different.

12. The method for producing a fiber preform according to claim 1, wherein the deposition head is connected to a controllable positioning unit, wherein the deposition head is moved relative to the surface.

13. The method for producing a fiber preform according to claim 1, wherein the fiber bundles are heated after the cut-to-length unit and prior to deposition on the surface and/or on the fiber bundles deposited on the surface.

14. The method for producing a fiber preform according to claim 1, wherein the fiber bundles are transported away from the cut-to-length unit via a nozzle channel of a nozzle head pressurized with compressed air.

15. The method for producing a fiber preform according to claim 1, wherein particulate or droplet-shaped matrix material is sprayed together with the fiber bundles onto the surface and/or the fiber bundles deposited on the surface.

16. The method for producing a fiber preform according to claim 15, wherein particulate matrix material is introduced into a nozzle channel, which material is sprayed together with the fiber bundles onto the surface and/or the fiber bundles deposited on the surface.

17. The method for producing a fiber preform according to claim 1, wherein a compacting step follows the step of depositing the reinforcing fiber bundles, wherein in the compacting step, the deposited reinforcing fiber bundles are compacted to achieve a higher fiber volume percentage than before the compacting.

18. A method for producing a fiber composite component using a fiber preform produced according to claim 1, comprising:
   introduction of the fiber preform into a shaping device,
   exposing the fiber preform to pressure or vacuum and/or increased temperature to form the fiber composite component,
   cooling the fiber composite component,
   removing the fiber composite component from the shaping device.

* * * * *